United States Patent [19]

Rzeszewski

[11] Patent Number: 4,622,578
[45] Date of Patent: Nov. 11, 1986

[54] FULLY COMPATIBLE HIGH DEFINITION TELEVISION

[75] Inventor: Theodore S. Rzeszewski, Lombard, Ill.

[73] Assignee: AT&T Bell Laboratories, Murray Hill, N.J.

[21] Appl. No.: 583,099

[22] Filed: Feb. 23, 1984

Related U.S. Application Data

[63] Continuation-in-part of Ser. No. 462,065, Jan. 28, 1983, abandoned.

[51] Int. Cl.[4] .................... H04N 11/06; H04N 11/14
[52] U.S. Cl. ........................................ 358/12; 358/16
[58] Field of Search ................... 358/11, 12, 14, 16

[56] References Cited

U.S. PATENT DOCUMENTS

| | | | |
|---|---|---|---|
| 2,686,831 | 8/1954 | Dome | 358/141 |
| 3,617,626 | 11/1969 | Bluth | 178/6.6 A |
| 4,296,431 | 10/1981 | Holland | 358/12 |
| 4,300,161 | 11/1981 | Haskell | 359/142 |
| 4,490,749 | 12/1984 | Hirota | 358/320 |

FOREIGN PATENT DOCUMENTS 2101835  1/1983  United Kingdom ............... 358/39

OTHER PUBLICATIONS

Herold, "A Compatible High-Resolution TV System for Cablecasting", *Proceedings of the IEEE*, vol. 56, No. 7, Jul. 1970, pp. 1013-1015.
"High-Definition Wide Screen Television System for the Future-Present State of the Study of HDTV Systems in Japan", T. Fujio, IEEE Trans. on Brdcstg. 12/180, vol. BC-26, No. 4.
"The Future of High-Definition Television: First Portion of a Report of th SMPTE Study Group on High--Definition Television", Fink, *SMPTE Journal*, 2/80, vol. 89, No. 2, pp. 89-94.
"The Future of High-Definition, Television: Conclusion of a Report of the SMPTE Study Group on High--Definition Television", Fink, *SMPTE Journal*, 3/80, vol. 89, No. 3, pp. 153-161.
"High-Definition Television System-Signal Standard and Transmission", T. Fujio, *SMPTE Journal*, 8/80, vol. 89, No. 8, pp. 579-584.
"Fibre Optic Analogue Transmission Experiment for High-Definition Television Signals Using Semiconductor Laser Diodes", *Electronics Letters*, Jul. 3, 1980, vol. 16, No. 14, pp. 536-538.
"Research and Development on High-Definition Television in Japan", K. Hayashi, *SMPTE Journal*, Mar. 1981, vol. 90, No. 3, pp. 178-186.
"Magnet Recording of a High-Definition Television Signal", Abe et al, *SMPTE Journal*, vol. 90, No. 3, Mar. 1981, pp. 192-195.
"High-Definition Television System-Signal Standards and Transmission", T. Fujio et al., IBC 80, Int. Broadcasting Convention Brighton, UK, Sep. 20-23, 1980, pp. 14-18.

(List continued on next page.)

Primary Examiner—John W. Sheppard
Assistant Examiner—Michael P. Dunnam
Attorney, Agent, or Firm—John C. Moran

[57] ABSTRACT

A fully compatible high definition signal, which can still be received with conventional resolution by conventional TV receivers without auxiliary apparatus is provided by the present invention. One TV channel carries the conventional TV signal while high frequency luminance and chrominance information is provided in a second TV channel. The baseband signal containing the high frequency components is derived from the lower sideband output of a product modulator whose inputs are taken from an anti-alias filtered (camera) source of wideband luminance information and a local oscillator whose frequency is a multiple of the conventional chrominance subcarrier frequency embedded in the conventional baseband signal for the other channel. Band-limited portions of the high-frequency chrominance information are multiplexed between alternate horizontal lines and modulated by a signal which is an even multiple of the line rate to provide a single sideband spectrum that non-interferingly interleaves the high frequency luminance spectra.

12 Claims, 8 Drawing Figures

OTHER PUBLICATIONS

"Development Options for Future Television Systems", Wendland, HDTV Committee Minutes Sponsered by SMPTE.

"High-Definition Television and Compatibility with Existing Standards", Sandbank et al., Tomorrow's Television Conference, Nashville, Tenn., Feb. 5-6, 1982.

"High Definition Television Studies on Compatible Basis with Present Standards", Seminar 1982, Sponsored by Dept. of Communication at U. of Dortmund, W. Germany, Prof. Wendland.

"Transients in Color Television", P. W. Howells, Proceedings of the IRE, Jan, 1954, pp. 212-220.

"Transistor Effects in Compatible Color Television", J. B. Chatten, Proceedings of the IRE; Jan. 1954, pp. 221-227.

"Reproduction of Luminance Detail by NTSC Color Television Systems", Livington, Proceedings of the IRE, Jan. 1954, pp. 228-234.

"Selected Papers from the Proceedings of the National Television System Committee and Its Panels", Fink, Television Standards and Practice, 1943.

"Time-Frequency Multiplexing (TFM) of Two NTSC Color TV Signals-Simulation Results", Haskell, Bell System Technical Journal, vol. 60, No. 5, May-Jun. 1981, pp. 643-660.

"The New Mark VIII Automatic Colour Camera", Underhill, Principles of Video Processing, pp. 12-16.

"Time Compression Multiplexing of Multiple Television Signals in Satellite Channels Using Chirp Transform Processors", Kai Eng., et al., No. 12, 12/81, pp. 1832-1840.

"Signal Processing for Compatible HDTV-Systems, First Results", Wendland, U. of Dortmund, HDTV Colloquium Sponsored by Canadian Govt. Ottawa, Canada, Oct. 18-21, 1982.

"Networking Aspects of High Definition Television", Toth, Bell-Northern Research, HDTV Colloquium Sponsored by Canadian Govt., Ottawa, Canada, Oct. 18-21, 1982.

"Compatiblity Aspects of HDTV", Powers, RCA Laboratories, HDTV Colloquium Sponsored by Canadian Govt., Ottawa, , Canada, Oct. 18-21, 1982.

"Universal Weighted Power Function of Television Noise and Its Application to High-Definition TV System Design", T. Fujio, SMPTE Journal, vol. 89, No. 9, Sep. 1980.

"Transmission Primaries and Signal Forms, "Fujio et al., NHK Technical Monograph, No. 32, Jun. 1982.

"Towards the Implementation of a Compatible HDTV System in North America", Rhodes, High Definition TV Colloquium Post Conference Proceedings 1982, Ottawa, Canada, Oct. 18-21, 1982, p. 1.5.

"A Study of High-Definition TV System in the Future", T. Fujio, IEEE Trans. on Brdcstg. 12/78, vol. BC-24, No. 4, pp. 92-100.

"Present Situation of Japanese Satellite Broadcasting for Experimental Purpose", T. Ishida, et al., IEEE Trans. on Brdcstg. 12/79, vol. BC-25, No. 4, pp. 105-112.

"A Univeral Weighted Power Function of Television Noise & Its Application to High Definition TV System Design", T. Fujio, IEEE Trans. On Brdcstg. 6/80, vol. BC-26, No. 2, pp. 39-47.

"A Compatible High-Definition Television System", T. S. Rzeszewski, The Bell System Technical Journal, vol. 62, No. 7, Sep., 1983, U.S.A.

FULLY COMPATIBLE HIGH DEFINITION TELEVISION

CROSS-REFERENCE TO RELATED APPLICATION

This application is a continuation-in-part of T. S. Rzeszewski 1, "Fully Compatible High Definition Television", Ser. No. 462,065, which was filed on Jan. 28, 1983, now abandoned.

TECHNICAL FIELD

This invention relates to a system for providing improved television picture quality and, more particularly, to a system that provides a signal of improved quality to specially designed receivers and a signal of the usual quality to conventional receivers without alteration.

BACKGROUND OF THE INVENTION

It has long been desired to provide a high definition television picture which approaches the quality of a projected 35 mm photographic film image. See, for example, *Image Quality*, "A Comparison of Photographic and Television Systems," Otto H. Schade, Jr., RCA Corporation, 1975.

The principal problems in achieving this goal are that any new system must use signals that can be received by conventional television receivers operating according to their respective NTSC, PAL, or SECAM standards, without modification (i.e., fully compatible reception) and that the enhanced signal must be capable of being broadcast to the newly designed receivers without requiring prohibitively large amounts of bandwidth.

Prior art suggestions promising better picture quality but which require greatly increased bandwidth or which are not compatible with existing receivers are disclosed, inter alia, in the *SMPTE Journal* articles "The Future of High-Definition Television: First Portion of a Report of the SMPTE Study Group on High-Definition Television," by D. G. Fink, Vol. 89, No. 2, February 1980 at pp. 89–94 and Vol. 89, No. 3, March 1980 at pp. 153–161; "High Definition Television System-Signal Standard and Transmission" by T. Fujio, Vol. 89, No. 8, August 1980, pp. 579–584; and "Research and Development on High-Definition Television in Japan" by K. Hayashi, Vol. 90, No. 3, March 1981 at pp. 178–186. In these systems, the lines per frame range from 1023 to 2125 and the required bandwidths range from 20 to 50 megahertz (MHz).

Other techniques labeled as high-definition or high-resolution television systems have advocated some modification of the manner of transmitting the conventional TV signal to provide increased aspect ratio, greater horizontal line resolution or a better filtering of the color subcarrier pattern. U.S. Pat. No. 2,686,831 issued to R. B. Dome on Aug. 17, 1954 proposes to improve picture quality by subdividing the baseband picture signal spectrum into three contiguous bands. The low frequency portion of the spectrum would be transmitted during all picture fields but the medium and "superhigh" frequency portions would be time multiplexed among the odd and even fields, respectively. U.S. Pat. No. 4,296,431 issued to K. F. Holland on Oct. 20, 1981, proposes that the two color axes of the picture signal be inverted at different rates to provide better cancellation of the nonlinear phase shift characteristics of the transmission media. The color subcarrier frequency is chosen as twice the standard (NTSC) frequency to reduce horizontal sweep harmonic interference so that the color subcarrier in adjacent frames may be 180° out of phase.

Another technique for improving the horizontal and vertical definition and for reducing low frequency flicker is disclosed in the article "Concepts For A Compatible HIFI-Television System" by B. Wendland in *NTG-Fachber*, (Germany), Vol. 7, September, 1980, at pp. 407–416. Double rate image sampling, digital signal processing and offset sampling are used together with image storage at the receiver.

A convenient summary of suggested techniques is contained in recent papers presented at the October 1982 HDTV colloquium of the SMPTE in Ottawa, Canada: "High Definition Television and Its Alternatives," by Ian Childs, B. B. C.; "Signal Processing for Compatible HDTV Systems, First Results," by B. Wendland, Dortmund University, West Germany; "Television Systems For The Future," by T. S. Robson, I. B. A.; and "Compatibility Aspects of HDTV," by Kerns H. Powers, RCA Laboratories.

The Childs paper described split luminance coding for the PAL system to reduce the effects of cross-color. The proposal would use the increased bandwidth available in the satellite channel under the 1977 World Administration Radio Conference (WARC) plan to contain the upper portion of the normal baseband luminance spectrum in a region split away from the band occupied by the chrominance information. The normal high-frequency luminance signals would be conveniently shifted from the normal baseband by using the color subcarrier, i.e., approximately 4.4 MHz in the PAL system. This particular shift was chosen because the color subcarrier is available in both the coder and decoder with accurately known phase and has minimum visability in the decoded signal. The use of only one carrier would also avoid intermodulation in the satellite transponder. However, because the proposed system cannot be received by a standard PAL receiver unless a satellite "front end" were added, the system is not fully compatible with existing conventional (PAL) receivers. Further, the proposed system merely reduces the effects of cross-color without attempting to increase vertical and horizontal resolution.

SUMMARY OF THE INVENTION

In accordance with the principles of my invention, high definition television picture signals are provided which can be received at ordinary resolution on conventional, unmodified television sets (according to their respective NTSC, PAL or SECAM standard) and which can be received on modified receivers without the need for more than twice the bandwidth of the conventional broadcast channel.

In the illustrative embodiment, which is based on the NTSC system of 80 lines per MHz of horizontal bandwidth, a horizontal resolution equivalent to 600 lines is obtained starting with a source capable of providing a baseband luminance signal having a bandwidth of 7.5 MHz instead of the conventional 4.2 MHz bandwidth. Such a source may comprise a higher resolution camera that would scan at twice the standard line rate and have a resolution that is at least double the standard in the horizontal dimension and approximately double in the vertical dimension. The higher resolution signal, advantageously subjected to anti-alias filtering to improve vertical resolution, is then applied to a YIQ matrix capable of handling the broadband signal. A lower portion of the baseband luminance signal (Y), equivalent to that employed in standard TV, (illustratively extending from 0 to 3 MHz) is delivered to a conventional (illustratively, NTSC) encoder to provide the conventional baseband video signal. However, the upper portion (illustratively, that extending from 2.5 to 7.5 MHz) of the increased bandwidth baseband luminance signal is delivered to a separate circuit which includes a modulator, advantageously of the "product" type.

The local oscillator of the modulator in the illustrative embodiment has a frequency chosen to be a predetermined multiple of the frequency of the chrominance subcarrier. The predetermined multiple is chosen so that neither of the sidebands output by the modulator will overlap the conventional baseband video signal spectrum. Illustratively, the lower sideband is then selected by a band-pass filter. For example, to achieve a horizontal resolution equivalent to 600 lines, delivery of the upper 5 MHz of the 7.5 MHz baseband luminance spectrum to the modulator determines that the predetermined multiple should be 3.5 times the frequency of the chrominance subcarrier in order not to overlap any portion of the conventional (NTSC) baseband spectra. In the NTSC system where the frequency of the chrominance subcarrier is 3.579545 MHz the lower sideband output of the modulator would extend from 4.9 to 10.1 MHz thereby avoiding overlap into the conventional baseband video spectrum which has a cutoff frequency of 4.2 MHz.

At a conventional receiver, the luminance and chrominance signals of the conventional broadcast channel may be detected by conventional receiver RF, IF and video decoder circuitry without modification. At the newly designed receiver of my invention, the chrominance signal may also be detected by conventional type circuitry. The high fidelity luminance signal, however, is detected by heterodyning or mixing the signal from the upper channel with a local oscillator set at the predetermined multiple of the chrominance subcarrier embedded in the conventional channel. The lower side band signal produced by this mixing is then added to the conventionally-detected video signal to yield an enhanced picture signal having a horizontal resolution of up to 600 lines.

Further in accordance with my invention, the definition of the color components of the baseband TV signal may also be improved. In the conventional (NTSC) color encoding scheme, the reproduction of high color purity impairs picture detail. Thus, if a pure red signal is attempted to be encoded there would, of course, be no blue or green signals. Since the luminance signal, which carries the detail is normally composed of 30 percent red, 59 percent green, and 11 percent blue, the absence of any blue or green signals means that the luminance, and therefore, the rendition of picture detail suffers.

In accordance with my invention, band-limited segments of the high-frequency portions of the increased bandwidth I and Q signals are time multiplexed among successive horizontal lines of the picture. Cross-luminance and cross-color effects are reduced by modulating the multiplexed color signals with an even-multiple of the horizontal sweep frequency to provide a single sideband spectrum that interleaves in a non-interfering manner with the luminance spectrum.

BRIEF DESCRIPTION OF THE DRAWINGS

The foregoing and other objects and features of my invention may become more apparent from reading the ensuing specification together with the drawing in which.

GENERAL DESCRIPTION

Figure 1:
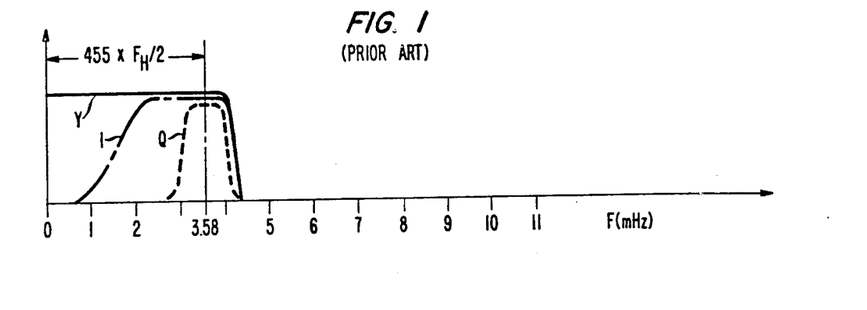
FIG. 1 shows the amplitude-frequency characteristic of the conventional baseband video signal.

FIG. 1 shows the nominal baseband amplitude-frequency characteristics of the video signal at the transmitter in the conventional NTSC system. The frequency of the chrominance subcarrier, $F_{sc}$, is displaced by the 455th harmonic of half the horizontal line-scanning frequency $F_H$ from the origin. This relationship was chosen to take advantage of the fact that the luminance spectra, Y, is actually not continuous (as shown) but exists as a multiplicity of groups of signals (not shown) centered about harmonics of the line-scanning frequency, $F_H$. The chrominance subcarrier $F_{sc}$ is set at a frequency which is an odd harmonic of half the line scanning frequency, so as to lie in a valley between two of such signal groups.

The chrominance subcarrier $F_{sc}$ is conventionally quadrature amplitude modulated by two chroma signals designated I and Q in FIG. 1. The Q-chroma signal reproduces colors from yellow-green to purple, while the I-chroma signal transmits hues ranging from bluish-green (cyan) to orange. The I-chroma signal contains both double sideband and single sideband portions. The double sideband portion extends 0.5 MHz on either side of the in-phase chrominance subcarrier. The single sideband portion extends from 0.5 to 1.5 MHz below the in-phase chrominance subcarrier. The narrow band Q-chroma signal is double sidebanded, extending 0.5 MHz either side of the quadrature chrominance subcarrier.

While FIG. 1 shows the nominal baseband amplitude-frequency characteristic at the transmitter, many contemporary TV receivers do not use the full bandwidth of the I-chroma spectrum and instead confine their demodulation to hardly more than the 1 MHz bandwidth encompassing the double-sideband portions of the I and Q signals.

Figure 2:
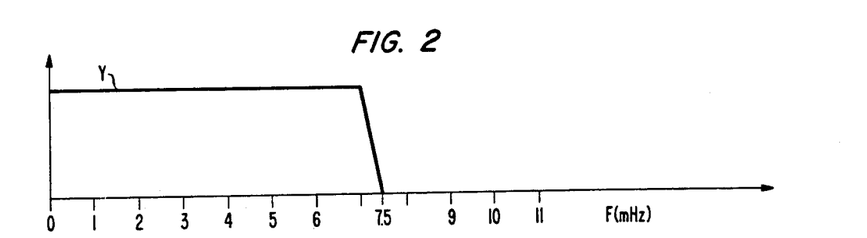
FIG. 2 shows the baseband amplitude-frequency characteristic of a wideband video source.

In FIG. 2, the baseband amplitude-frequency characteristic of a wideband video source having an illustrative luminance bandwidth of 7.5 MHz (adequate to provide a horizontal resolution of 600 lines) is shown. This broadened baseband source is assumed to be provided by improved camera technology as heretofore mentioned. The required bandwidth is determined by the degree of improved horizontal resolution desired. Resolution is usually expressed in terms of vertical resolution and horizontal resolution. The vertical resolution tells the number of horizontal lines alternating between black and white that can be resolved in the TV image. The horizontal resolution of a system can be expressed in terms of (vertical) lines that are of the same width as the horizontal lines used to determine the vertical resolution. Since a cycle of horizontal bandwidth (half the horizontal line white, half black) contains the information equivalent of two vertical lines, the width of the lines must be adjusted to be the same as for vertical resolution taking the 4 to 3 aspect ratio into account. The horizontal resolution per unit of video bandwidth is, therefore, determined by multiplying the effective horizontal line time by two and dividing by the aspect ratio. In the NTSC system, the effective horizontal line time is 53.5 micro seconds and the aspect ratio is 4/3. Accordingly, the horizontal resolution of the NTSC system may be expressed as approximately 80 lines/MHz. Most NTSC receivers have about 3 MHz of bandwidth that results in 240 lines of resolution. The 7.5 MHz source bandwidth will permit 600 lines of horizontal resolution to be achieved.

Figure 3:
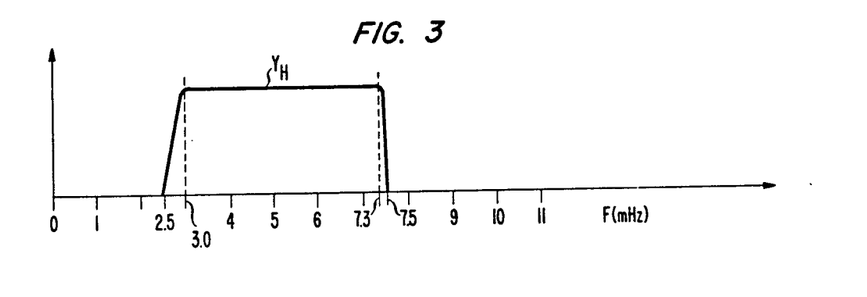
FIG. 3 shows the result of high-pass filtering the amplitude-frequency characteristic of FIG. 2.
Figure 4:
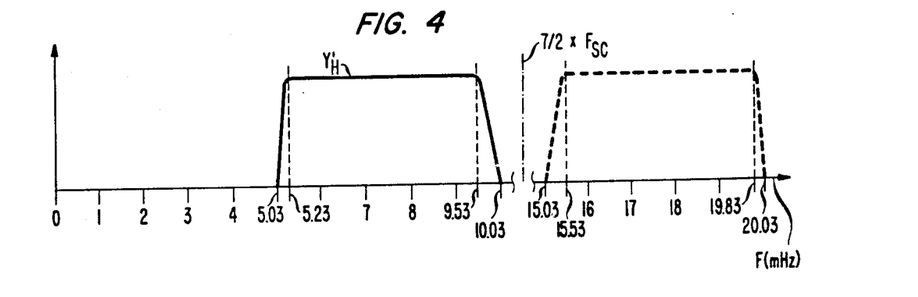
FIG. 4 shows the two side bands produced by modulating the signal of FIG. 3.
Figure 5:
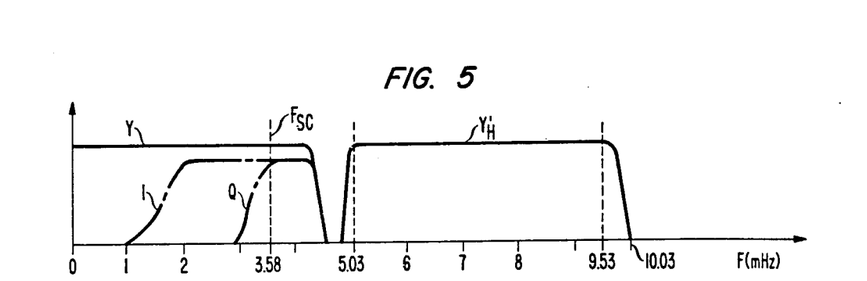
FIG. 5 shows a composite baseband amplitude-frequency characteristic containing the conventional (NTSC) portion of FIG. 1 and the lower sideband portion of FIG. 4.

In accordance with my invention, the wideband luminance source signal of FIG. 2 is presented both to a conventional (NTSC) encoder and to a high-pass filter. The NTSC encoder accepts the lower 4.2 MHz of the 7.5 MHz luminance signal as shown in FIG. 1. The high-pass filter, having a cutoff frequency of approximately 3 MHz presents a luminance output, $Y_H$, shown in FIG. 3. The luminance output $Y_H$ is delivered to a modulator, advantageously of the "product" type having a local oscillator whose frequency is set at 3.5 times that of the chrominance subcarrier $F_{sc}$ embedded in the NTSC portion of FIG. 1. The modulator output contains the upper and lower sideband signals shown in FIG. 4. The upper sideband of FIG. 4 is discarded and the lower sideband is added to the conventional NTSC portion to yield the composite baseband amplitude-frequency characteristics shown in FIG. 5.

Figure 6:
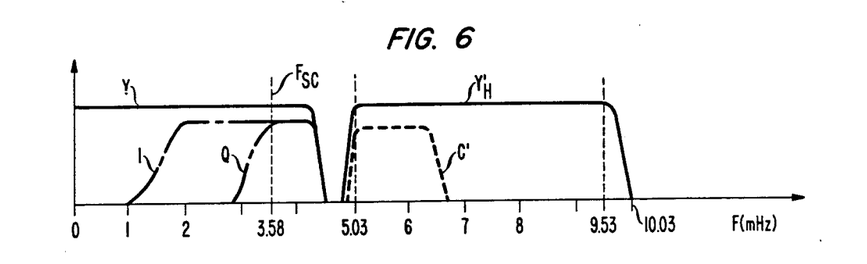
FIG. 6 shows the composite baseband amplitude-frequency characteristic of my invention including interleaved high-frequency multiplexed chrominance signals.

Further in accordance with my invention, an improvement in color rendition is achieved. In the conventional NTSC encoding of color information, the bandwidth allocated to color is less than the bandwidth allocated to the luminance (which determines picture detail). As shown in FIG. 1, for example, the Q component of color is conventionally allocated only about one-eighth the luminance (Y) bandwidth and the I component of color is nominally allocated somewhat less than one-third the luminance bandwidth. However, because the I component's single sideband portion is received at half the amplitude of the double sideband portion, difficult filtering problems would be encountered at the receiver and so, in actual practice, the I component of color is allocated no more bandwidth in the receiver than the Q component. In accordance with my invention, a greater portion of the increased bandwidth that is allocated to luminance is made available for chrominance information than in the NTSC system. This is shown in FIG. 6 where high-frequency chrominance information C' occupies a greater proportion of the bandwidth allocated to Y than the effective chrominance information Q occupied of the Y bandwidth in the NTSC system of FIG. 1.

DETAILED DESCRIPTION

Figure 7:
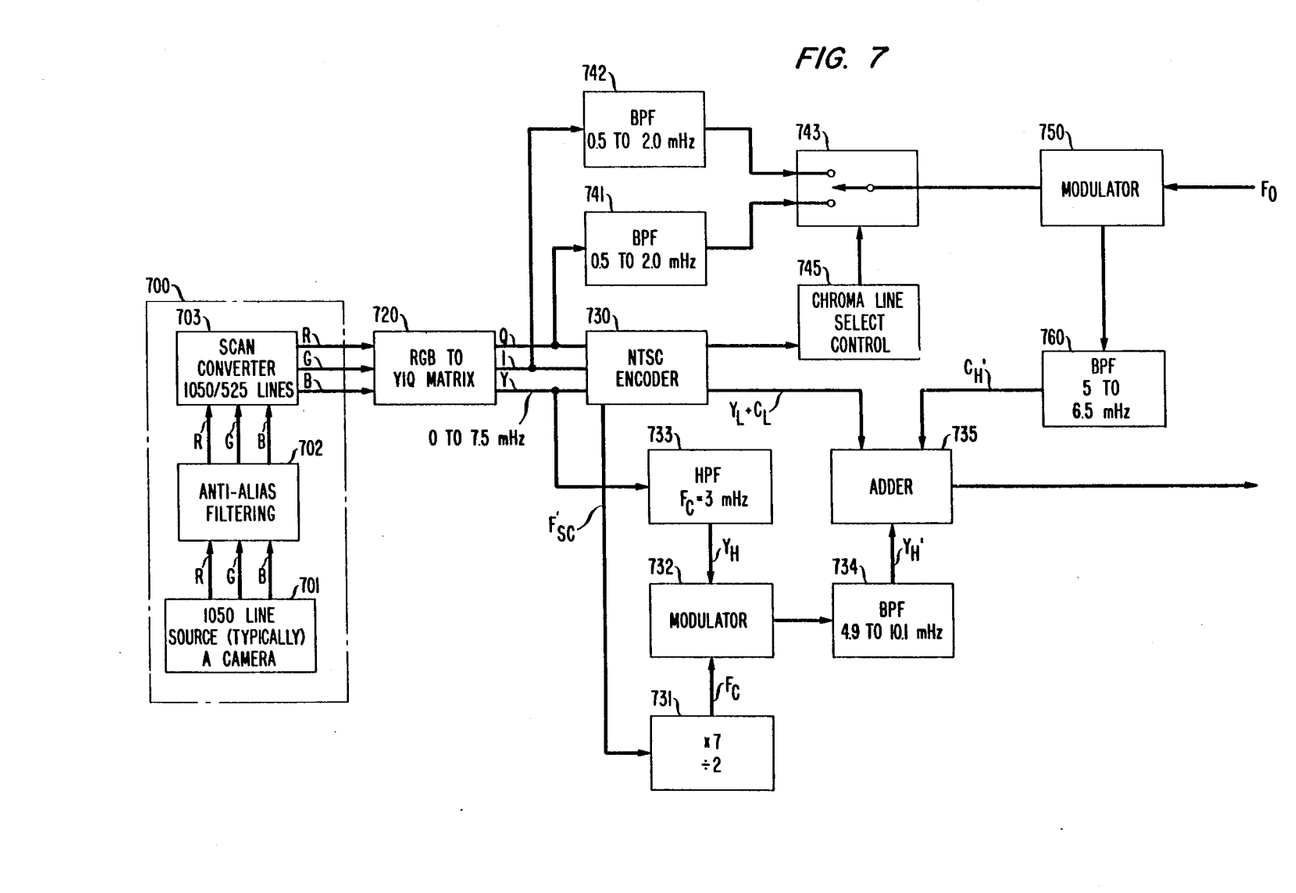
FIG. 7 is a block diagram of the high definition encoder according to my invention.

Referring now to FIG. 7, a block diagram of the enhanced resolution TV modulator of my invention will be described. The increased bandwidth baseband signal of FIG. 2 is provided by circuit 700. Circuit 700, which advantageously may be of the type described in the foregoing Wendland article, contains an improved video source camera 701 capable of providing an output having more than the conventional number of scanning lines. Illustratively, a camera 701 capable of functioning as a 1050 line source of wideband red, green and blue signals, R, G, B, is provided. The wideband R, G, B signals from camera 701 are then subjected to anti-alias filtering by circuit 702 to remove frequency components above the Nyquist rate.

Figure 8:
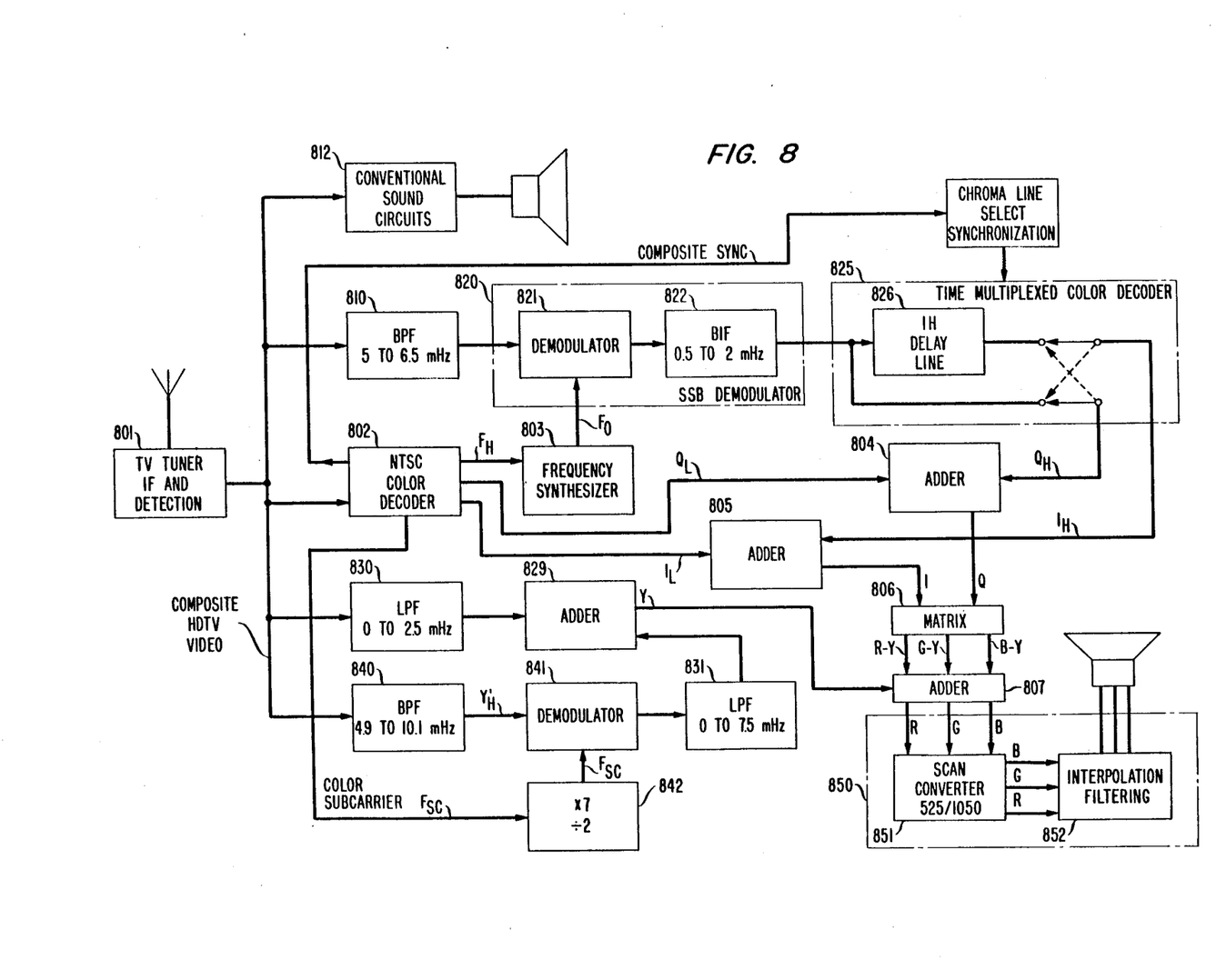
FIG. 8 is a block diagram of the high definition decoder of my invention.

Because the scanning process that changes the image into an electrical signal in the camera and then reassembles the image on the picture tube is really a sampling process, the vertical resolution is usually determined by reducing the effective number of scan lines (the total number less the number of lines in the vertical blanking interval) by the "Kell factor" of 0.6 to 0.7. Band-limiting of the camera/source signal, however, reduces the effects of aliasing and provides a Kell factor approaching unity so that a vertical resolution approaching 483 lines, (525−2×21) is achieved. The point spread function (PSF) of the camera and the display are analogous to the impulse response in linear circuit theory and are usually adjusted by shaping the electron beam. However, a narrow PSF in the vertical direction means a wide frequency spectrum and aliasing, and a wide PSF means overlapping of adjacent lines and low-pass filtering in the vertical direction (defocusing). In the NTSC system, the PSF is adjusted to compromise between aliasing and defocusing. In accordance with the principles of the illustrative embodiment, anti-aliasing (prefiltering) is employed in circuit 700 of the coder apparatus of FIG. 7 and interpolation (post filtering) is employed at the corresponding circuit 850 decoder apparatus of the receiver, (FIG. 8).

In circuit 700, the anti-alias filtered camera signals are applied by circuit 702 to scan converter 703. Scan converter 703 deletes every second line of each of the 1050 line R, G, B signals to obtain a 525 line signal for ultimate transmission that will be compatible with the baseband of existing (NTSC) television receivers. The wideband R, G, B signals at the output of scan converter 703 are applied to the RGB-to-YIQ conversion matrix 720. Because of the wideband input of the R, G, B signals, the luminance output Y of conversion matrix 720 exhibits the wideband amplitude-frequency characteristics of FIG. 2.

NTSC encoder 730 receives the Y, I, Q output of matrix 720 and provides conventional luminance and chrominance output signals, $Y_L + C_L$, to adder 735, a composite sync signal to circuit 745, and the conventional NTSC chrominance subcarrier signal $F_{sc}$ to circuit 731. In the absence of any other input, the output of adder 735 would simply provide a conventional NTSC baseband signal to the final video modulator stage (not shown) which would radiate a signal in a designated TV channel according to the frequency of the video carrier selected. However, in accordance with my invention, adder 735 is provided with two additional inputs $C'_H$ and $Y'_H$ to be described, which are transmitted by a final modulator stage (not shown) on the second of two designated TV channels. These two channels should preferably be adjacent channels to minimize the effects of weather, however, more widely separated channels may also be employed.

Circuit 731 receives the chrominance subcarrier $F_{sc}$ and serves as a local oscillator for a modulator 732. The frequency of the local oscillator output is advantageously chosen to be 7/2 the frequency of the chrominance subcarrier $F_{sc}$. In the NTSC system, where the baseband chrominance subcarrier is $455 \times F_H/2$, the local oscillator frequency, $F_c$, provided by circuit 731 to modulator 732 would be approximately 12.53 MHz. The other signal that is input to modulator 732 is the upper portion of the wideband luminance signal, $Y_H$, that is taken from the Y signal output of matrix 720 after being filtered by high-pass filter 733. Filter 733 is advantageously chosen to have a cutoff frequency of approximately 3 MHz.

The output of modulator 732 contains the two sidebands shown in FIG. 4. The upper sideband is suppressed in band-pass filter 734 and the lower sideband $Y'_H$ is passed to adder 735. The combination in adder 735 of the conventional signals $Y_L + C_L$ from NTSC encoder 730 with the wideband luminance signal $Y'_H$ from filter 734 yields a baseband output signal having the amplitude-frequency characteristic of FIG. 5. This amplitude-frequency characteristic is capable of providing a high definition image within a signal spectrum requiring not more than two conventional (6 MHz) video channels.

In accordance with another aspect of my invention, however, I also provide circuitry for enhancing the definition of the high-frequency chrominance components of the video signal. The Q and I outputs of conversion matrix 720 are, respectively, delivered to band-pass filters 741 and 742 which limit each chrominance component to a 1.5 MHz bandwidth extending from 0.5 to 2.0 MHz. The band-limited outputs of filters 741 and 742 are sampled at half the normal line ($F_H/2$) rate by color multiplexer 743 under the control of line selection circuit 745. Line selection circuit 745 receives the composite sync output of NTSC encoder 730 and controls color multiplexer 743, advantageously by counting the sync pulses, so that each new field starts its first line from the I signal output of filter 742.

The high-frequency chrominance components, I and Q, alternately selected by color multiplexer 743 are applied to product modulator 750. The frequency of the local oscillator $F_o$ that is applied to product modulator 750 is chosen so that the chrominance output spectra of the modulator will interleave, without interference, the high-frequency luminance spectra of the signals from band pass filter 734. Since color multiplexer 743 samples the I and Q chrominance components at half the horizontal line rate, ($F_H/2$), the multiplexer's output spectra is naturally grouped at multiples of half the line rate. This grouping would interfere with the luminance spectra which contains signals grouped at multiples of the NTSC color subcarrier, $F_{sc}$. To avoid this interference, the local oscillator frequency, $F_o$, applied to product modulator 750 is proportioned according to the formula $F_o = 288 F_H$.

The high-frequency multiplexed chrominance components at the output of modulator 750 are applied to band-pass filter 760 to eliminate the lower sideband. The upper sideband output, $C'_H$, of filter 760 is applied to one input of adder 735. Since the other inputs of adder 735 are the conventional NTSC baseband signal and the high-frequency luminance, $Y'_H$, the output of adder 735 provides the composite baseband signal of FIG. 6.

Compatibility with existing receivers is immediately apparent because the lower portion of the composite signal (FIG. 6) may be decoded by conventional NTSC receiver circuitry. However, in accordance with an illustrative embodiment of the improved decoder of my invention, both the conventional NTSC spectrum as well as the high wideband amplitude-frequency characteristics are decoded.

An illustrative embodiment of a decoder according to my invention is shown in FIG. 8. RF tuner, video detector and IF stage 801 receives the incoming TV signal, i.e., the two TV channels containing the broadband luminance and chrominance information heretofore described. Accordingly, stage 801 may contain either a broadband RF tuner capable of receiving two adjacent TV channels or separate RF tuners each tuned to a respective channel. In either event, the output of circuit 801 provides the baseband amplitude-frequency characteristic of FIG. 6. Circuit 801 is coupled at its output to circuits 802, 810, 812, 830 and 840.

NTSC color decoder 802 receives the broadband signal of FIG. 6 from stage 801 and at its output provides the conventional (narrowband) Q and I chrominance signals designated, $Q_L$ and $I_L$ to adders 804 and 805, respectively. Adders 804 and 805 combine the conventional Q and I chrominance signal with the high-frequency chrominance signals that is derived from stage 801 by the tandem arrangement of band-pass filter 810, single sideband demodulator 820 and color demultiplexer 825. Band-pass filter 810 delivers the 1.5 MHz wide color signal extending from 5 to 6.5 MHz to demodulator 820. This signal is a replica of the signal $C'_H$ of FIG. 7.

The local oscillator frequency utilized by the product demodulator 821 of single sideband demodulator 820 is provided by frequency synthesizer 803 from the horizontal sweep frequency output $F_H$ provided by NTSC color demodulator 802. This corresponds to the procedure for using the even-multiple of the line rate employed in FIG. 7. Band pass filter 822 limits the output of demodulator 821 to the lower sideband signal. The signals at the output of 821 are in time-multiplexed form. Demultiplexer 825 operates upon these multiplexed signals and provides continuous I and Q signals to adders 804 and 805, respectively. In demultiplexer 825, delay line 826 provides for one horizontal line of color information storage so that the present line's I (Q) signal and the previous line's Q (I) signal, stored in delay line 826, can be simultaneously presented to adders 805 and 804. The composite I and Q signals at the outputs of adders 805 and 804 are applied to conversion matrix 806 which produces wideband output R−Y, G−Y, and B−Y outputs to adder 807.

A high-frequency luminance input, Y, to adder 807 is provided from adder 829 which receives as inputs the outputs of low pass filters 830 and 831. Filter 830 constrains the composite wideband video signal provided by stage 801 to the region 0 to 2.5 MHz. Low pass filter 831 delivers the lower sideband output, 0 to 7.5 MHz, provided by product demodulator 841. Product demodulator 841 receives a local oscillator input from circuit 842 that is 7/2 the frequency of the color subcarrier $F_{sc}$ detected by NTSC color decoder 802. The other input to product demodulator 841 is the upper portion of the baseband video signal extending from approximately 4.9 to 10.1 MHz as shown in FIG. 6.

The composite high resolution R, G, and B signals provided at the output of adder 807 are delivered to output circuit 850 which includes a 525-to-1050 line scan converter 851 and an interpolating filter circuit 852. The interpolated R, G, and B signals from circuit 852 are then available to be displayed on the TV screen of the receiver.

CONCLUSION

A fully compatible, bandwidth-conserving high definition television coding and decoding scheme has been described in terms of an NTSC environment that uses a 10 MHz baseband signal that can be modulated to produce AM vestigial sideband signals within two standard 6 MHz TV channels. One of the channels is of the type to be receivable by conventional receivers without alteration. Horizontal resolution of up to 600 lines is achievable from a 7.5 MHz luminance bandwidth. The source of 1050 line luminance and chrominance signals is subjected to anti-alias filtering to achieve a vertical resolution of up to 483 lines. Cross-talk between the individual baseband components of color and luminance signals is avoided by non-interferingly interleaving multiplexed components of the high-frequency color signal into the high-frequency luminance spectra.

The circuits and amplitude characteristics which have been described are deemed to be illustrative of the principles of my invention. Numerous modifications may be made by those skilled in the art without, however, departing from the spirit and scope of my invention.

What is claimed is:

1. A method of generating a high resolution baseband video signal from a line-scanning source of anti-alias filtered video signals having a number of scanning lines per frame and a bandwidth adequate to provide the desired degree of vertical and horizontal resolution, comprising the steps of
    modulating a high-pass filtered portion of said source signals with a signal having a frequency that is a multiple of the frequency of the chrominance subcarrier embedded in a lower portion of said baseband source signals to produce a sideband signal having spectra that do not overlap the spectra of said lower portion,
    multiplexing among successive horizontal lines only the band-limited high-frequency portions of the color signal contained in said source signals,
    modulating said multiplexed band-limited color signal with a carrier signal to provide a single-sideband color spectrum that non-interferingly interleaves the high-frequency luminance spectra of said produced sideband signal and the modulated multiplexed color signal, and
    combining said produced sideband signal with said lower portion of said baseband signals.

2. The method of claim 1 wherein said signal for modulating said high-pass filtered source signals has a frequency such that the frequency of the highest frequency component of said source signals when subtracted from the frequency of said modulating signal lies above the highest frequency of said lower portion of said baseband signals.

3. The method of claim 2 wherein said carrier signal comprises an even multiple of the line scanning rate and said multiplex band-limited color signal modulating step comprises the step of modulating said multiplex band limited color signal with said even multiple of said line scanning rate.

4. The method of claim 3, further comprising
    deriving a line scanning synchronizing signal from said chrominance subcarrier; and
    controlling said multiplexing responsive to said synchronizing signal to begin each new frame with a predetermined component of said color signal, 5. A method of decoding a high-definition baseband video signal having a chrominance subcarrier embedded in the low-band portion of said signal which subcarrier is an odd-multiple of half the line scanning rate and having high-resolution chrominance and luminance video information in the upper-band portion of said signal comprising
    adding to a low-pass filtered portion of said signal the lower sideband luminance output of the modulation result of beating a band-pass filtered upper portion of said signal with a local oscillator having a frequency that is a non-unitary multiple of said chrominance subcarrier, and
    demodulating the upper-band chrominance portion with a local oscillator signal having a signal that is an even multiple of the line scanning frequency.

6. A method for decoding a high-definition baseband video signal having a chrominance subcarrier which is an odd-multiple of half the line scanning rate embedded in the low-frequency portion of said signal and having high-resolution video information in the upper-frequency portion of said signal comprising the steps of:
    heterodyning a band-pass filtered portion of said signal with a local oscillator frequency that is an even multiple of the line scanning frequency,
    band-pass filtering the lower sideband product of said heterodyning, and
    demultiplexing the output of said band-pass filter to obtain I chrominance and Q chrominance information signals.

7. A method for providing a high-resolution baseband video signal from a video signal source having a bandwidth adequate to provide the desired degree of horizontal resolution comprising the steps of:
    forming from said video signal source a low-frequency baseband signal having an embedded chrominance subcarrier
    product modulating a high-pass filtered upper portion of said source signal with a signal having a frequency that is a multiple of the frequency of the chrominance subcarrier embedded in said baseband signal
    band-pass filtering the output of said product modulation to select the lower sideband of said output,
    anti-aliasing filtering said video signal source,
    band-pass filtering the I and Q chrominance signals from said source signal,
    alternately product-modulating said band-pass filtered I and Q chrominance signals with a local oscillator frequency which is an even-multiple of the line scanning frequency of said video signal source to non-interferingly interleave with said lower sideband of said output, and
    combining said lower sideband of said output and the alternatively product-modulated chrominance signals with said low-frequency baseband signal.

8. A system for generating a high-resolution baseband video signal from a line-scanning source of anti-alias filtered video signals having a number of scanning lines per frame and a bandwidth adequate to provide the desired degree of vertical and horizontal resolution, said system comprises means for modulating a high-pass filtered portion of said source signals with a signal having a frequency that is a multiple of the frequency of the chrominance subcarrier embedded in a lower portion of said baseband source signals to produce a sideband signal having spectra that do not overlap the spectra of said lower portion, means for multiplexing among successive horizontal lines only the band-limited high-frequency portions of the color signal contained in said source signals, means for modulating said multiplexed band-limited color signal with a carrier signal to provide a single-sideband color spectrum that non-interferingly interleaves the high-frequency luminance spectra of said produced sideband signal, and means for combining the produced sideband signal and the modulated multiplexed band-limited color signal with said lower portion of said baseband signals.

9. The system of claim 8 wherein said signal for modulating said high-pass filtered source signals has a frequency such that the frequency of the highest component of said source signals when subtracted from the frequency of said modulating signal lies above the highest frequency of said lower portion of said baseband signals.

10. The system of claim 9 further comprises means for deriving a line scanning synchronizing signal from said chrominance subcarrier, and said multiplexing means comprises means responsive to said synchronizing signal to being each new frame with a predetermined portion of said color signal.

11. A system for decoding a high-definition baseband video signal having a chrominance subcarrier embedded in the low-band portion of said video signal whose subcarrier is an odd-multiple of half the line scanning rate and having high-resolution chrominance and luminance video information in the upper-band portion of said video signal, said system comprises means for band-pass filtering an upper portion of said signal, means for demodulating the band-pass filtered upper portion of said signal to extract the high-resolution luminance information with a local oscillator signal having a frequency that is a non-unitary multiple of said chrominance subcarrier, means for low-pass filtering said low-band portion of said video signal, means for decoding chrominance information from said low-band portion of said video signal, means for chrominance band-pass filtering said upper-band portion of said signal;

means for demodulating said chrominance band-pass filtered upper-band portion of said signal with a local oscillator signal having a signal that is an even multiple of the line scanning frequency;

means for adding the demodulated chrominance band-pass filtered uppper portion of said signal with the low-band chrominance portion for display purposes; and means for adding the low-pass filtered portion of said video signal with the lower luminance sideband portion of the modulated band-pass filtered upper portion of said video signal for display purposes.

12. A system for decoding a high-definition baseband video signal having a chrominance subcarrier which is an odd-multiple of half the line scanning rate embedded in the lower frequency portion of said signal and having a high-resolution video signal in the upper-frequency portion of said baseband video signal, said system comprises means for heterodyning a band-pass filtered portion of said baseband video signal with a local oscillator signal that is an even-multiple of the line scanning frequency, means for band-pass filtering the lower sideband product of said heterodyning means, and means for demultiplexing the output of said band-pass filtering means to obtain I chrominance and Q chrominance information signals.

* * * * *